March 13, 1928.  W. H. McGEE  1,662,465
GOLF CLUB GAUGE AND TRUING TOOL
Filed July 15, 1926
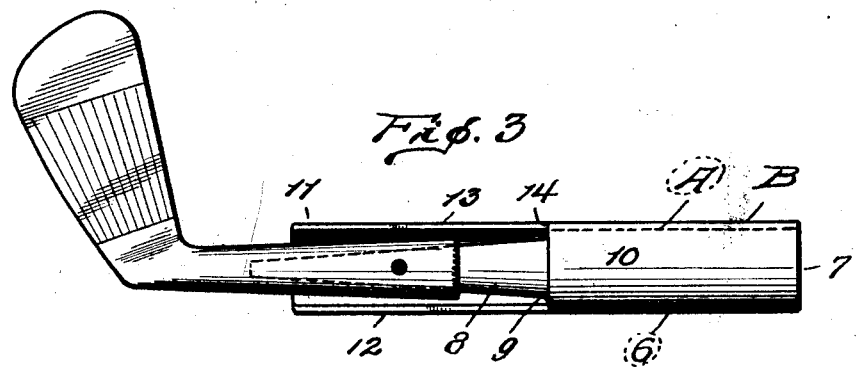
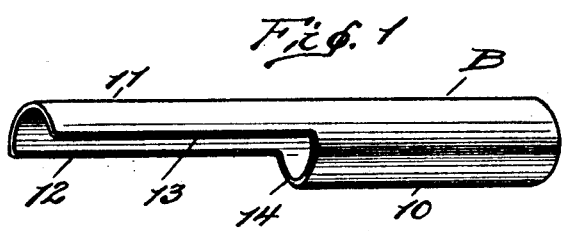
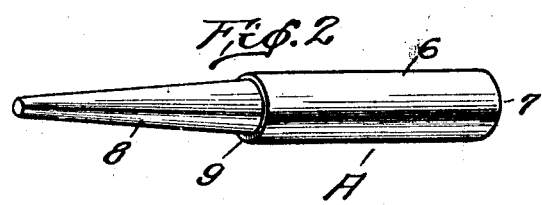
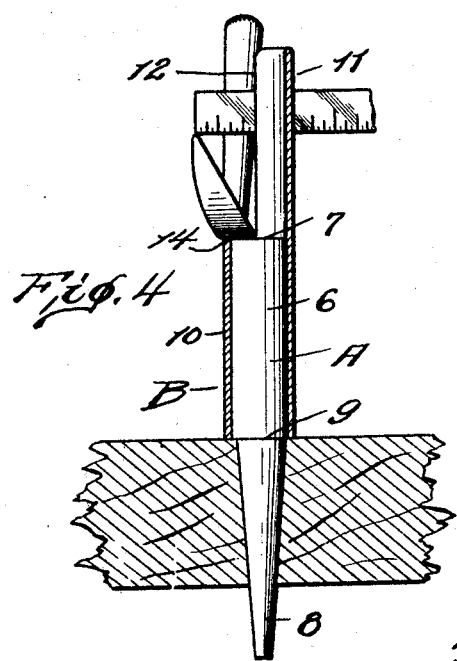
INVENTOR
WILLIAM H. McGEE,
by R. S. Berry,
Attorney.

Patented Mar. 13, 1928.

1,662,465

UNITED STATES PATENT OFFICE.

WILLIAM H. McGEE, OF LOS ANGELES, CALIFORNIA.

GOLF-CLUB GAUGE AND TRUING TOOL.

Application filed July 15, 1926. Serial No. 122,608.

My invention relates to improvements in golf club gauges and truing tools, and more particularly to means for facilitating accurate determination of the "loft" and straightness of the hosel of golf clubs and for use as an anvil for straightening "out of line" hosels.

Among the objects of my invention is to provide a device of simple and inexpensive construction comprising one element consisting of a substantially cylindrical body, or shank, having an aligned and reduced coniform extension and a second element consisting of a substantially cylindrical tubi-form body having an aligned and reduced extension of substantially semi-circular section, which elements combine to form a gauge to determine the straightness of a hosel, and which elements combined with a linear scale form a gauge to determine the loft of a golf club and which element having the coniform forms an anvil over which defective hosels may be straightened.

My improvements consists in the novel construction, arrangement and combination of parts as hereinafter fully, clearly and concisely described, definitely pointed out in my claims and illustrated by the accompanying drawing (1 sheet) in which—

Fig. 1 is a perspective view of the gauge element.

Fig. 2 is a perspective view of the anvil element.

Fig. 3 is a plan view of the two elements as used for determining the straightness of a hosel.

Fig. 4 is an elevation, partly in section of the two elements as used for determining the loft of a club.

Referring more specifically to the drawing A designates a unitary element comprising a substantially cylindrical body, or shank 6 whose one end, or base, 7 is a plane surface disposed at an exact right angle to the axis of the body and at whose other end there is a coniform extension 8, the base of which, is integral with the body 6 and, has a diameter less than the body whereby a shoulder 9 is formed.

The letter B designates a second unitary element comprising a tubular body, or sleeve, 10 having a length and cross-section corresponding with the body 6 of the element A. and an integral and aligned extension 11 of semicircular section whose free margins 12 and 13 are straight and aligned with the axis of the body 10, and at a right angle to the shoulder 14, formed by the reduction at the intersection of the body 10 and extension 11, and which shoulder is flush and forms a continuation of the base 7 of the element A when the two elements are combined for use as a loft gauge, as shown in Fig. 4.

In the employment of the device as a hosel gauge the elements A and B are arranged as shown in Fig. 3 with the semicylindrical extension 11 of the element B coincident with the coniform extension 8 of the element A. The hosel of a golf club is then slipped over the coniform extension and rotated thereabout and if there is distortion in the hosel there will be noticeable variations in the distance between the outer peripheral surface of the hosel and the inner perimeter of the gauge extension 11 of the element B.

For straightening a distorted or defective hosel the coniform 8 of the element A is inserted in the hosel and employed as an anvil.

In the employment of the device as a "loft" gauge, that is the angle of the "face" relative to the "sole" of the head, the element A is supported as by inserting its extension 8 in a bore formed in a suitable support as shown in Fig. 4, the element B slipped over the element A with the shoulder 14 of the element B flush with the base 7 of the element A.

The club head is then placed with its sole rested squarely upon the base 7 of the element A and the point of the heel snugly rested against the margins 12 and 13 of the extension 11 of the element B. By the use then of a lineal scale as shown in Fig. 4 the loft is determined by a measurement of the distance separating the margin 12 (or 13) of the element B from the apex or crown of the golfhead.

I claim:—

1. In a device of the class described, an element having a substantially cylindrical body and an aligned coniform extension the small end of which is directed away from said body, and a second element to cooperate therewith having a substantially cylindrical tubular body adapted closely to fit around the tubular body of the first named element and an aligned extension of substantially semi-circular section which is adapted to cooperate with said coniform extension when said elements are in telescopic relation to each other to detect distortion in the hosel of a golf club.

2. In a device of the class described, an element having a substantially cylindrical body and a sectionally reduced aligned coniform extension the base of which is integral with said body but of smaller diameter than said body to provide a shoulder around said base, and a second cooperating element having a substantially cylindrical tubular body and an aligned segmental extension of less than a complete circular section which is adapted to cooperate with said coniform extension when the two main elements are in telescopic relation to each other to detect distortion in the hosel of a golf club.

3. In a device of the class described, an element having a substantially cylindrical body and an aligned coniform extension the base of which is less in diameter than said body to provide a shoulder around said base adapted to rest upon a support having a bore adapted to fit around said coniform extension, and a second cooperating element having a substantially cylindrical tubular body substantially equal in length to the length of the tubular portion of said body around which it is adapted to telescope, said second element having also an aligned segmental extension of less than a complete circular section thereby adapting the device to perform the function of a combination loft gauge and anvil when said cylindrical member is supported with its coniform extension directed downwardly and said tubular element with its segmental portion directed upwardly is telescoped therearound.

In testimony whereof, I have affixed my signature.

WILLIAM H. McGEE.